(12) United States Patent
Vogel et al.

(10) Patent No.: US 6,804,262 B1
(45) Date of Patent: Oct. 12, 2004

(54) METHOD AND APPARATUS FOR CHANNEL DETERMINATION THROUGH POWER MEASUREMENTS

(75) Inventors: Mark O. Vogel, Hampshire, IL (US); Philip T. Robinson, Barrington, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/560,087

(22) Filed: Apr. 28, 2000

(51) Int. Cl.$^7$ .................................................. H04J 1/00

(52) U.S. Cl. ...................... 370/480; 370/281; 370/302; 370/343

(58) Field of Search ................................ 370/487, 490, 370/493, 494, 495, 431, 484, 480, 343, 281, 302; 725/111; 375/222, 232, 348, 346, 350, 326, 340, 335, 261, 281, 324, 219, 229; 379/349

(56) References Cited

U.S. PATENT DOCUMENTS

| | | | |
|---|---|---|---|
| 3,688,197 A | 8/1972 | Kahn .......................... | 325/315 |
| 4,166,980 A | 9/1979 | Apostolos et al. ........... | 325/363 |
| 4,227,255 A | 10/1980 | Carrick et al. .............. | 455/226 |
| 4,270,217 A | 5/1981 | Baker .......................... | 455/165 |
| 4,501,020 A | 2/1985 | Wakeman .................... | 455/226 |
| 4,521,915 A | 6/1985 | Baker et al. ................. | 455/165 |
| 4,597,107 A | 6/1986 | Ready et al. ................ | 455/226 |
| 4,644,533 A | 2/1987 | Braff et al. .................. | 370/94 |
| 4,881,263 A | 11/1989 | Herbison et al. ............ | 380/21 |
| 4,996,685 A | 2/1991 | Farese et al. ............... | 370/58.1 |
| 5,014,234 A | 5/1991 | Edwards, Jr. ............... | 364/900 |
| 5,014,348 A | 5/1991 | Boone et al. ................ | 455/165 |
| 5,138,712 A | 8/1992 | Corbin ........................ | 395/700 |
| 5,189,413 A | 2/1993 | Gaskill et al. ........... | 340/825.44 |
| 5,301,273 A | 4/1994 | Konishi ....................... | 395/200 |
| 5,347,304 A | 9/1994 | Moura et al. ................ | 348/12 |
| 5,363,408 A | 11/1994 | Paik et al. ..................... | 375/39 |
| 5,430,727 A | 7/1995 | Callon ...................... | 370/85.13 |
| 5,442,749 A | 8/1995 | Northcutt et al. ...... | 395/200.09 |
| 5,488,412 A | 1/1996 | Majeti et al. ................ | 348/10 |
| 5,489,897 A | 2/1996 | Inoue .................... | 340/870.39 |
| 5,528,595 A | 6/1996 | Walsh et al. ............. | 370/85.13 |
| 5,583,931 A | 12/1996 | Schneider et al. .......... | 379/399 |
| 5,586,121 A | 12/1996 | Moura et al. ............... | 370/404 |

(List continued on next page.)

FOREIGN PATENT DOCUMENTS

WO WO 00/67385 * 11/2000 ............ H04B/1/38

OTHER PUBLICATIONS

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

(List continued on next page.)

Primary Examiner—Wellington Chin
Assistant Examiner—Jamal A. Fox
(74) Attorney, Agent, or Firm—McDonnell Boehnen Hulbert & Berghoff

(57) ABSTRACT

In a data-over-cable system, a cable head-end transmits a signal that includes a plurality of analog television signal components an at least one quadrature amplitude modulated (QAM) digital signal component, the signal components being defined by frequency channels. A cable modem has a tunable frequency selection system, operable at a first bandwidth, corresponding to the bandwidth of the frequency channels, and at a second, substantially narrower bandwidth, that provides a filtered signal and a power measurement system that measures the power level of the filtered signal. The frequency selection system scans through the channels, operating at its second bandwidth, and, in each channel, tunes to a first frequency and a second frequency. The power levels of the filtered signals from the first and second frequencies are measured and compared to distinguish the QAM digital signal components from the other signal components.

37 Claims, 6 Drawing Sheets

U.S. PATENT DOCUMENTS

| | | |
|---|---|---|
| 5,598,410 A | 1/1997 | Stone .......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ...................... 348/6 |
| 5,610,910 A | 3/1997 | Focsaneanu et al. ........ 370/351 |
| 5,623,542 A | 4/1997 | Schneider et al. .......... 379/399 |
| 5,623,601 A | 4/1997 | Vu .......................... 395/187.01 |
| 5,636,211 A | 6/1997 | Newlin ....................... 370/465 |
| 5,651,030 A | 7/1997 | Wong et al. ................. 375/316 |
| 5,675,732 A | 10/1997 | Majeti et al. ........... 395/200.01 |
| 5,675,742 A | 10/1997 | Jain et al. ...................... 395/200 |
| 5,678,041 A | 10/1997 | Baker et al. ................. 395/609 |
| 5,708,654 A | 1/1998 | Arndt et al. ................. 370/242 |
| 5,710,885 A | 1/1998 | Bondi .................... 395/200.54 |
| 5,724,510 A | 3/1998 | Arndt et al. .............. 395/200.5 |
| 5,731,699 A | 3/1998 | O'Byrne .................... 324/77.11 |
| 5,751,772 A | 5/1998 | Mannette et al. ........... 375/316 |
| 5,761,602 A | 6/1998 | Wagner et al. ............... 455/3.1 |
| 5,778,181 A | 7/1998 | Hidary et al. .......... 395/200.48 |
| 5,784,597 A | 7/1998 | Chiu et al. .................... 395/552 |
| 5,790,198 A | 8/1998 | Roop et al. .................. 348/460 |
| 5,790,548 A | 8/1998 | Sistanizadeh et al. ....... 370/401 |
| 5,790,677 A | 8/1998 | Fox et al. ....................... 380/24 |
| 5,790,770 A | 8/1998 | McClure et al. ........ 395/200.61 |
| 5,790,806 A | 8/1998 | Koperda ................ 395/200.82 |
| 5,793,747 A | 8/1998 | Kline .......................... 370/230 |
| 5,794,147 A | 8/1998 | Huang ........................ 455/434 |
| 5,799,086 A | 8/1998 | Sudia ........................... 380/23 |
| 5,805,804 A | 9/1998 | Laursen et al. ......... 395/200.02 |
| 5,809,252 A | 9/1998 | Beighe et al. .......... 395/200.57 |
| 5,812,819 A | 9/1998 | Rodwin et al. ............. 395/500 |
| 5,815,664 A | 9/1998 | Asano .................... 395/200.57 |
| 5,818,845 A | 10/1998 | Moura et al. ............... 370/449 |
| 5,819,028 A | 10/1998 | Manghirmalani et al. ....................... 395/185.1 |
| 5,819,042 A | 10/1998 | Hansen ................... 395/200.52 |
| 5,828,655 A | 10/1998 | Moura et al. ............... 370/236 |
| 5,828,666 A | 10/1998 | Focsaneanu et al. ........ 370/389 |
| 5,835,720 A | 11/1998 | Nelson et al. .......... 395/200.54 |
| 5,835,727 A | 11/1998 | Wong et al. ............ 395/200.68 |
| 5,841,777 A | 11/1998 | Cohen ......................... 370/433 |
| 5,848,233 A | 12/1998 | Radia et al. ............. 395/187.01 |
| 5,852,721 A | 12/1998 | Dillon et al. ........... 395/200.47 |
| 5,854,901 A | 12/1998 | Cole et al. ................... 709/245 |
| 5,859,852 A | 1/1999 | Moura et al. ............... 370/449 |
| 5,864,679 A | 1/1999 | Kanai et al. ................. 709/238 |
| 5,870,134 A | 2/1999 | Laubach et al. .............. 348/12 |
| 5,872,523 A | 2/1999 | Dellaverson et al. .. 340/825.52 |
| 5,883,901 A * | 3/1999 | Chiu et al. ................... 370/508 |
| 5,884,024 A | 3/1999 | Lim et al. ............... 395/187.01 |
| 5,892,754 A | 4/1999 | Kompella et al. ........... 370/236 |
| 5,894,479 A | 4/1999 | Mohammed ................ 370/401 |
| 5,903,558 A | 5/1999 | Jones et al. .................. 370/351 |
| 5,909,549 A | 6/1999 | Compliment et al. ....... 709/223 |
| 5,913,037 A | 6/1999 | Spofford et al. ........ 395/200.56 |
| 5,915,119 A | 6/1999 | Cone ...................... 395/750.02 |
| 5,922,049 A | 7/1999 | Radia et al. ................. 709/220 |
| 5,922,051 A | 7/1999 | Sidey ........................... 709/223 |
| 5,923,659 A | 7/1999 | Curry et al. ................. 370/401 |
| 5,926,458 A | 7/1999 | Yin .............................. 370/230 |
| 5,929,850 A | 7/1999 | Broadwin et al. ........... 345/327 |
| 5,941,988 A | 8/1999 | Bhagwat et al. ............. 713/201 |
| 5,943,604 A | 8/1999 | Chen et al. ................... 455/5.1 |
| 5,954,797 A | 9/1999 | Sidey ........................... 709/223 |
| 5,958,007 A | 9/1999 | Lee et al. ..................... 709/219 |
| 5,960,177 A | 9/1999 | Tanno .................... 395/200.59 |
| 5,974,453 A | 10/1999 | Anderson et al. ........... 709/220 |
| 5,982,748 A | 11/1999 | Yin et al. ..................... 370/232 |
| 5,987,524 A | 11/1999 | Yoshida et al. .............. 709/245 |
| 5,991,292 A | 11/1999 | Focsaneanu et al. ........ 370/352 |
| 5,991,306 A | 11/1999 | Burns et al. ................. 370/429 |
| 5,996,076 A | 11/1999 | Rowney et al. ............. 713/201 |
| 5,999,536 A | 12/1999 | Kawafuji et al. ........... 370/401 |
| 5,999,563 A * | 12/1999 | Polley et al. ................ 375/222 |
| 6,003,077 A | 12/1999 | Bawden et al. ............. 709/223 |
| 6,005,851 A | 12/1999 | Craddock et al. ........... 370/329 |
| 6,006,264 A | 12/1999 | Colby et al. ................. 709/226 |
| 6,009,103 A | 12/1999 | Woundy ...................... 370/401 |
| 6,012,088 A | 1/2000 | Li et al. ....................... 709/219 |
| 6,013,107 A | 1/2000 | Blackshear et al. ......... 703/229 |
| 6,014,545 A | 1/2000 | Wu et al. ..................... 455/3.1 |
| 6,018,767 A | 1/2000 | Fijolek et al. ............... 709/218 |
| 6,031,841 A | 2/2000 | Woundy ...................... 370/410 |
| 6,032,019 A | 2/2000 | Chen et al. ................... 455/5.1 |
| 6,041,041 A | 3/2000 | Ramanathan et al. ....... 370/241 |
| 6,046,979 A | 4/2000 | Bauman ...................... 370/229 |
| 6,049,546 A | 4/2000 | Ramakrishnan ............. 370/412 |
| 6,049,825 A | 4/2000 | Yamamoto ................... 709/221 |
| 6,049,826 A | 4/2000 | Beser .......................... 709/222 |
| 6,052,724 A | 4/2000 | Willie et al. ................. 709/223 |
| 6,058,421 A | 5/2000 | Fijolek et al. ............... 709/225 |
| 6,061,349 A | 5/2000 | Coile et al. .................. 370/389 |
| 6,064,372 A | 5/2000 | Kahkoska .................... 345/173 |
| 6,065,049 A | 5/2000 | Beser .......................... 709/218 |
| 6,070,187 A | 5/2000 | Subramaniam et al. ..... 709/220 |
| 6,070,242 A | 5/2000 | Wong et al. ................. 713/201 |
| 6,070,246 A | 5/2000 | Beser .......................... 713/201 |
| 6,073,178 A | 6/2000 | Wong et al. ................. 709/229 |
| 6,075,787 A | 6/2000 | Bobeck et al. .............. 370/395 |
| 6,091,709 A | 7/2000 | Harrison et al. ............. 370/235 |
| 6,094,431 A | 7/2000 | Yamato et al. .............. 370/395 |
| 6,104,700 A | 8/2000 | Haddock et al. ............ 370/235 |
| 6,112,258 A | 8/2000 | Miller et al. ................... 710/19 |
| 6,122,254 A | 9/2000 | Aydemir et al. ............. 370/235 |
| 6,128,298 A | 10/2000 | Wootton et al. ............. 370/392 |
| 6,130,879 A | 10/2000 | Liu .............................. 370/230 |
| 6,130,880 A | 10/2000 | Naudus et al. ............... 370/235 |
| 6,131,023 A * | 10/2000 | Matsuura ..................... 455/301 |
| 6,137,792 A | 10/2000 | Jonas et al. .................. 370/354 |
| 6,137,793 A | 10/2000 | Gorman et al. .............. 370/360 |
| 6,148,410 A | 11/2000 | Baskey et al. .................. 714/4 |
| 6,157,965 A | 12/2000 | Mohammed et al. ........... 710/8 |
| 6,169,569 B1 * | 1/2001 | Widmer et al. .............. 725/111 |
| 6,170,061 B1 | 1/2001 | Beser .......................... 713/201 |
| 6,178,455 B1 | 1/2001 | Schutte et al. ............... 709/228 |
| 6,185,624 B1 | 2/2001 | Fijolek et al. ............... 709/239 |
| 6,189,102 B1 | 2/2001 | Beser .......................... 713/201 |
| 6,208,656 B1 | 3/2001 | Hrastar et al. ............... 370/401 |
| 6,212,563 B1 | 4/2001 | Beser .......................... 709/227 |
| 6,216,171 B1 | 4/2001 | Isono et al. .................. 709/250 |
| 6,223,222 B1 | 4/2001 | Fijolek et al. ............... 709/227 |
| 6,230,326 B1 * | 5/2001 | Unger et al. ................. 725/111 |
| 6,240,464 B1 | 5/2001 | Fijolek et al. ............... 709/250 |
| 6,243,369 B1 | 6/2001 | Grimwood et al. ......... 370/335 |
| 6,260,072 B1 | 7/2001 | Rodriguez-Moral ........ 709/241 |
| 6,269,099 B1 | 7/2001 | Borella et al. ............... 370/389 |
| 6,272,150 B1 | 8/2001 | Hrastar ........................ 370/486 |
| 6,275,853 B1 | 8/2001 | Beser et al. .................. 709/223 |
| 6,289,377 B1 | 9/2001 | Lalwaney et al. ........... 709/222 |
| 6,295,554 B1 | 9/2001 | Karadogan ................... 709/219 |
| 6,301,117 B1 * | 10/2001 | Yamauchi et al. ........... 361/728 |
| 6,301,223 B1 | 10/2001 | Hrastar et al. ............... 370/227 |
| 6,301,618 B1 | 10/2001 | Sitaraman et al. .......... 709/227 |
| 6,308,328 B1 | 10/2001 | Bowcutt et al. ............. 725/111 |
| 6,331,987 B1 | 12/2001 | Beser .......................... 370/486 |
| 6,332,163 B1 | 12/2001 | Bowman-Amuah ......... 709/231 |
| 6,337,858 B1 | 1/2002 | Petty et al. ................... 370/356 |
| 6,351,773 B1 | 2/2002 | Fijolek et al. ............... 709/228 |
| 6,360,369 B1 * | 3/2002 | Mahoney .................... 725/111 |
| 6,370,147 B1 | 4/2002 | Beser .......................... 370/401 |
| 6,393,478 B1 | 5/2002 | Bahlmann .................... 709/224 |

| | | | |
|---|---|---|---|
| 6,442,158 B1 | | 8/2002 | Beser .......................... 370/352 |
| 6,449,291 B1 | | 9/2002 | Burns et al. ................. 370/516 |
| 6,453,472 B1 | * | 9/2002 | Leano et al. ................. 725/111 |
| 6,490,727 B1 | | 12/2002 | Nazarathy et al. ........... 725/129 |
| 6,510,162 B1 | | 1/2003 | Fijolek et al. ............... 370/432 |
| 6,549,587 B1 | * | 4/2003 | Li ............................... 375/326 |
| 6,574,796 B1 | * | 6/2003 | Roeck et al. ................ 725/111 |
| 2002/0122050 A1 | | 9/2002 | Sandberg ..................... 345/705 |
| 2002/0136165 A1 | | 9/2002 | Ady et al. .................... 370/241 |
| 2003/0028891 A1 | | 2/2003 | Hardt et al. ................. 725/107 |

OTHER PUBLICATIONS

"Operations Support System Interface Specification Baseline Privacy Interface MIB (Interim Specification) SP–OS-SI–BPI–I01–980331", MCNS Holdings, L.P., 1997 and 1998, pp. ii to 33.

"Cable Modem Termination System–Network Side Interface Specification (Interim Specification) SP–CMTS–N-SII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Baseline Privacy Interface Specification (Interim) SP–B-PI–I01–970922", MCNS Holdings, L.P., 1997, pp. ii to 65.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Security System Specification (Interim Specification) SP—SSI–I01–970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIP, Internet Engineering Task Force, Internet Draft, "<draft–ietf–ipcdn–tri–mib–00.1.txt>," Mar. 1998, pp. 1 to 26.

Kyees, P. J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95 ., 1995 International Conference, vol. 4, ISBN: 0–7803–2431–5, May 9–12, 1995, pp. 2655–2658.

Broadcom Corporation, *BCM3310 QAMLINK Communications Processor*, Product Brief, Broadcom Corporation, 16215 Alton Parkway, Irvine, California 92619–7013 (1999).

Broadcom Corporation, *BCM93310 DOCSIS External Cable Modem*, Product Brief, Broadcom Corporation, 16215 Alton Parkway, Irvine, California 92619–7013 (1999).

Broadcom Corporation, *BCM93300 DOCSIS Cable Modem Reference Design*, Product Brief, Broadcom Corporation, 16215 Alton Parkway, Irvine, California 92619–7013 (1999).

Broadcom Corporation, *BCM3300 QAMLINK Single Chip DOCSIS Cable Modem*, Product Brief, Broadcom Corporation, 16215 Alton Parkway, Irvine, California 92619–7013 (1999).

"Radio Frequency Interface Specification (Interim Specification) SP–RFI–I04–980724", MCNS Holdings, L.P., 1997, pp. ii to 196.

"Radio Frequency Interface Specification (Interim Specification) SP–RFI–I05–991105", MCNS Holdings, L.P., 1999, pp. ii. to 202.

"Radio Frequency Interface Specification (Interim Specification) SP–RFIv1.1–I06–001215", MCNS Holdings, L.P., 2000, pp. ii to 432.

"A Solution for the Priority Queue Problem of Deadline–Ordered Service Disciplines," N.R. Figueira, IEEE International Conference on Computer Communications and Networks, Sep. 22–25, 1997, pp.320–325.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 28, 1980, pp. 1–3.

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–I03–991105", MCNS Holdings, L.P., 1999, pp. Ii to 366.

* cited by examiner

METHOD AND APPARATUS FOR CHANNEL DETERMINATION THROUGH POWER MEASUREMENTS

FIELD OF INVENTION

The present invention relates to communication over a network. More specifically, the present invention relates to a method and apparatus for identifying a digital data channel from among a plurality of channels used in a data-over-cable system.

BACKGROUND OF THE INVENTION

With the explosive increase in the use of the Internet and other computer networks, many customers have desired network connections that provide a higher data rate than can be supported by a modem used over a standard telephone line. One approach has been to use the larger bandwidth of a cable television network to transmit data between customers' computers and the Internet and/or other computer networks. In such cable television networks, the signals are carried by cables, which are typically coaxial cables and/or fiber optic cables. Many cable television networks are Hybrid Fiber/Coaxial ("HFC") cable systems, in which fiber optic cables are used for the backbone, and coaxial cables are used to connect the subscribers to the backbone.

Cable television networks typically use a passband ranging from about 54 MHz to over 300 MHz for the transmission of signals in the downstream direction, i.e., to the customers. The signals typically include analog television signals, which may be in the NTSC, PAL, or other format. The signals may also include digital television signals, such as a high definition television ("HDTV") format. The passband is normally divided into a series of frequency channels, in accordance with a predetermined "channel plan" or "frequency plan." Cable television networks in the United States typically use one of three channel plans, the "standard" channel plan, the Incrementally Related Carrier ("IRC") channel plan, or the Harmonically Related Carrier ("HRC") channel plan. The "standard plan," which is set forth in the Electronic Industry Association's Interim Standard IS-6, provides a series of 6 MHz channels, with the lower edge of each channel set at an integral number of megahertz. For example, the lower edge of "Channel 2" in the "standard" plan is 54 MHz. The channels in an IRC channel plan are also 6 MHz, and their frequencies are largely the same as those in the "standard" plan. However, the IRC channel plan provides channels in the 72 MHz to 90 MHz range, whereas the "standard" plan does not. In an HRC channel plan, the channels are also 6 MHz wide, but it is the visual carrier that is set at an integral number of megahertz in each channel, rather than the lower channel edge. Thus, the lower edge of "Channel 2" is 52.75 MHz, with the visual carrier at 54 MHz.

When such cable television networks are used to connect customers to computer networks, such as the Internet, one or more of the channels in the channel plan are used as "data channels" to transmit data from the computer network to the customers. Typically, other channels are still used to transmit television signals in the downstream direction. When cable television networks are used to transmit data in this way, they become part of what is often referred to as a "Data-Over-Cable System." In such systems, cable modems, such as those provided by 3Com Corporation of Santa Clara, Calif., and others, provide the interface between the cable television network and the customers' computers. A cable modem is able to receive data transmitted downstream over the cable television network and forward it to a customer's computer. A cable modem is, typically, also able to send data from a customer's computer in an upstream direction, either via the cable television network or the public switched telephone network ("PSTN"). When used with cable television networks, cable modems are typically able to support a data connection to the Internet and other computer networks with a data rate of up to 30+Mbps, which is a much larger data rate than can be supported by a modem used over a standard telephone line.

Data-over-cable systems typically operate in accordance with the interim specifications set forth in the Data-Over-Cable Service Interface Specifications—Radio Frequency Interface Specification ("DOCSIS"), issued by Cable Television Laboratories, Inc. A recent version of DOCSIS, document control number SP-PFI-104-980724, dated Jul. 24, 1998, is incorporated herein by reference. DOCSIS may be found today on the World Wide Web at the Universal Resource Locator ("URL") "www.cablemodem.com".

When a cable modem is connected to a data-over-cable system, it must undergo an initialization procedure before it is able to transmit and receive data. As part of the initialization procedure, the cable modem attempts to find a data channel with which it can synchronize. A difficulty with this part of the initialization procedure is that when a cable modem is first used, it typically does not know which of the many possible channels will be a data channel it can use, or even what channel plan will be applicable. In fact, most of the possible channels in typical data-over-cable systems are used for television signals or are not used at all.

To find a useable data channel, most cable modems scan through the possible channels for each of the three-commonly-used channel plans, "standard," IRC, and HRC. In this approach, the cable modem tunes, typically in a predetermined pattern, to each channel specified by a given channel plan, attempts to demodulate the channel, and then access the transported data. This approach can be time-consuming, because the modem must spend time attempting to demodulate channels that may not be data channels and because all three channel plans may need to be scanned in order to obtain the data channel. Additionally, this approach may not work in countries that use a channel plan that is not one of the three described above or when the data-over-cable system uses a non-standard channel plan.

SUMMARY OF THE INVENTION

In a first principal aspect, the present invention provides a method for selectively receiving a target signal component from among a plurality of signal components that make up a signal transmitted over a cable network to a receiver in a cable telecommunications system. Each of the signal components has a distinct frequency range. In accordance with the method, a plurality of power measurements are obtained for a first signal component, and the first signal component is identified as being the target signal component if the plurality of power measurements satisfy predetermined criteria. The plurality of power measurements includes a first power measurement and a second measurement. The first power measurement is obtained by: (a) tuning a frequency selection system to a first center frequency within the frequency range of the first signal component, so that the frequency selection system provides a first filtered signal from a first band of frequencies centered about the first center frequency; and (b) measuring, the power of the first filtered signal to obtain the first power measurement.

Similarly, the second power measurement is obtained by: (a) tuning the frequency selection system to a second center frequency within the frequency range of the first signal component, so that the frequency selection system provides a second filtered signal from a second band of frequencies centered about the second center frequency; and (b) measuring the power of the second filtered signal to obtain the second power measurement.

In a second principal aspect, the present invention provide a method for selectively receiving a digital signal component from a plurality of signal components that make up a signal transmitted over a cable network to a cable modem in a data-over-cable system. The signal components are defined by a plurality of predetermined frequency channels, each having a channel bandwidth. The signal components include at least one analog signal component and at least one digital signal component, with the analog signal component being defined by analog channels and the digital signal components being defined by digital channels. The method includes the step of classifying a first channel based on the spectral component of any signal component present therein. To classify the first channel, a frequency selection system is tuned to a first center frequency within the first channel. The frequency selection system has a bandwidth substantially less than the channel bandwidth. The frequency selection system provides a first filtered signal from a first band of frequencies centered about the first center frequency, and the power of the first filtered signal is measured to obtain a first power measurement. Then, the frequency selection system is tuned to a second center frequency within the first channel. The frequency selection system provides a second filtered signal from a second band of frequencies centered about the second center frequency, and the power of the second filtered signal is measured to obtain a second power measurement.

In a third principal aspect, the present invention provides a cable modem for selectively receiving a digital signal component from a plurality of signal components that are transmitted as a signal over a cable network. The cable modem comprises a tunable frequency selection system, a demodulator, and a power measurement system. The frequency-selection system provides a filtered signal from a selected band of frequencies of the signal, and the frequency selection system is operable at a first bandwidth and a second, narrower, bandwidth. The demodulator obtains a digital signal by demodulating the filtered signal from the frequency selection system. The power measurement system provides a power level signal indicative of a power level associated with the filtered signal from the frequency selection system.

In a fourth principal aspect, the present invention provides a method for initializing a cable modem that is disposed to receive a signal transmitted over a cable network. The initialization process includes the following steps. The cable modem selectively receives a first band of frequencies centered about a first center frequency. The first band of frequencies has a first bandwidth. The cable modem receives a second band of frequencies centered about a second center frequency. This second band of frequencies has a bandwidth substantially equal to the first bandwidth. The cable modem then selectively receives a third band of frequencies centered about a third center frequency. The third band of frequencies has a bandwidth substantially greater than the first bandwidth. The third band of frequencies includes frequencies from the first band of frequencies and the second band of frequencies. The cable modem demodulates this third band of frequencies to obtain a digital signal, and the cable modem synchronizes with the digital signal.

In a fifth principal aspect, the present invention provides a method for selectively receiving a target signal component from among a plurality of signal components that make up a signal transmitted over a cable network to a cable modem in a data-over-cable system. The signal components are defined by a plurality of predetermined frequency channels. The cable modem has a tunable frequency selection system operable at a wide bandwidth and at a narrow bandwidth. The method includes the following steps. While operating at the narrow bandwidth, the frequency selection system tunes to a first frequency in a given one of the frequency channels and provides a first filtered signal from a first band of frequencies centered about the first frequency. The power of the first filtered signal is measured to obtain a first power measurement. While operating at the narrow bandwidth, the frequency selection system tunes to a second frequency in the given frequency channel and provides a second filtered signal from a second band of frequencies centered about the second frequency. The power of the second filtered signal is measured to obtain a second power measurement. If the first and second power measurements both exceed a predetermined level, the frequency selection system then operates at the wide bandwidth to provide a third filtered signal from a third band of frequencies in the given frequency channel.

In a sixth principal aspect, the present invention provides a method for identifying a possible plan in a cable telecommunications system in which a transmitter transmits a signal over a cable network to a receiver and the signal comprises a plurality of signal components defined by a plurality of predetermined frequency channels. The frequency channels have a channel bandwidth. The method includes the following steps. A frequency selection system tunes to a first frequency to provide a first filtered signal from a first band of frequencies of the signal centered about said first frequency. Tile first frequency corresponds to an expected frequency for a visual carrier in a first channel plan. The power of the first filtered signal is measured to obtain a first power measurement. The frequency selection system tunes to a second frequency to provide a second filtered signal from a second band of frequencies of the signal centered about said second frequency. The second frequency corresponds to an expected frequency for a visual carrier in a second channel plan. The power of the second filtered signal is measured to obtain a second power measurement. If the first power measurement exceeds the second power measurement by at least a predetermined amount, then the first channel plan is identified as the possible channel plan. If the second power measurement exceeds the first power measurement by at least a predetermined amount, then the second channel plan is identified as the possible channel plan.

DETAILED DESCRIPTION OF PREFERRED EMBODIMENTS

Figure 1:
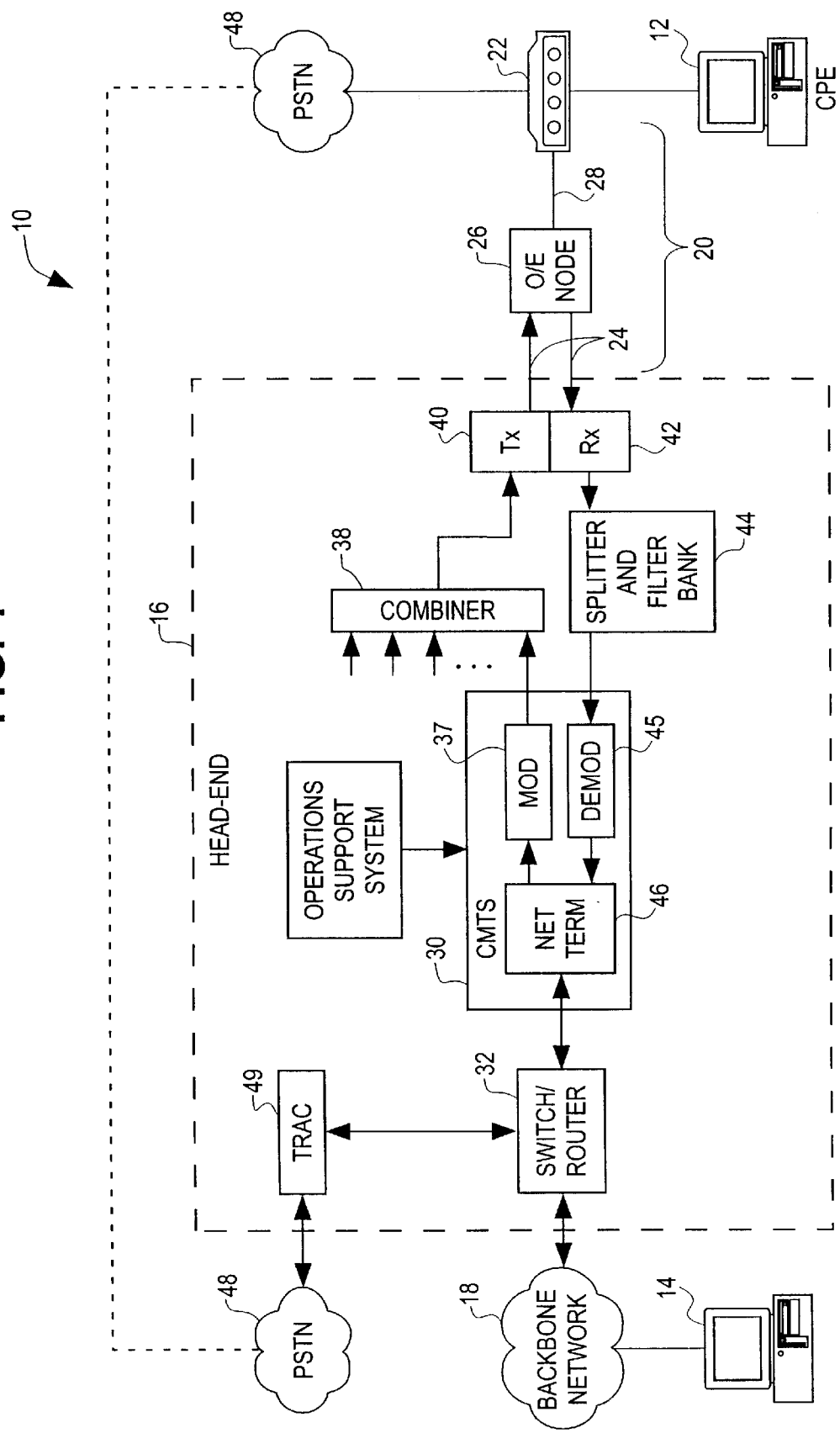
FIG. 1 is a block diagram illustrating a basic architecture for a data-over-cable system, for use with a preferred embodiment of the present invention.

The basic overall architecture of a data-over-cable system 10 for use with a preferred embodiment of the present invention is shown in FIG. 1. Data-over-cable-system 10, allows for communication between customer premise equipment ("CPE") 12 and a remote computer 14. CPE 12 is typically a general-purpose computer in a residential or business location. Alternatively, CPE 12 may be a multimedia display device or a point-of-sale terminal in a store, or CPE 12 could take still other forms. Data-over-cable system 10 includes a distribution hub or "head-end" 16 that is connected to remote computer 14 via a backbone network 18 and, possibly, one or more intermediate networks. Backbone network 18 is typically a wide-area digital network, such as the Internet. Head-end 16 is a central location that is responsible for sending cable signals in the downstream direction, i.e., toward CPE 12. Head-end 16 modulates digital data from backbone network 18 and transmits the signals over a cable network 20 to a cable modem 22. Cable modem 22 is, in turn, connected to CPE 12. Although only one cable modem and one CPE 12 are shown in FIG. 1, cable network 20 is typically connected to a plurality of cable modems, with each cable modem connected to a distinct CPE. As described in more detail below, cable modem 22 is an improved cable modem that distinguishes between analog television channels and digital data channels by their differing spectral profiles.

In cable network 20, the -signals are typically carried over coaxial cables and/or fiber optic cables. However, other media could also be used to carry signals in cable network 20. Preferably, cable network 20 includes an optical fiber network 24 that connects-head-end 16 to a plurality of optical/electronic ("O/E") nodes 26, and a coaxial cable network 28 that connects O/E nodes 26 to cable modems 22. O/E nodes 26 convert the optical signals from fiber network 24 to electrical signals for transmission over coaxial cable network 28. Cable modem 22 demodulates the signals transmitted downstream over cable network 20, extracts digital data, and supplies the digital data to CPE 12.

Head-end 16 typically includes a cable modem termination system ("CMTS") 30. CMTS 30 is connected to backbone network 18 via a switch/router 32. Switch/router 32 enables CMTS 30 to exchange digital data with remote computer 14 or with other devices connected directly or indirectly to backbone network 18. For transmission in the downstream direction, a modulation circuit ("MOD") 37 in CMTS 30 modulates the digital data received from the switch/router 32 and transmits the modulated data to a combiner 38. Preferably, modulation circuit 37 modulates the digital data using quadrature amplitude modulation (QAM). Alternatively, modulation circuit 37 may use other modulation methods. In the QAM approach, predetermined combinations of phase shift and amplitude variations are used to represent a predetermined set of bit combinations, which are often referred to as "symbols." Thus,: in an eight-symbol QAM signal, each of the three-bit combinations "000", "001". "010", "100", "101", "110", "011", and 111 is represented by a distinct combination of amplitude and phase shift. Most preferably, modulation circuit 37 uses 64-symbol or 256-symbol QAM.

Combiner 38 combines the modulated data with a plurality of television signals and sends the combined signal to a transmission module 40. Transmission module 40, in turn, transmits the combined signal over cable network 20. The television signals, are typically analog television signals that use an amplitude modulated (AM) visual carrier, such as NTSC or PAL television signals. Some of the television signals may also be digital television signals, such as HDTV signals that may also use QAM. In this way, the combined signal that transmission module 40 transmits over cable network 20 typically includes a plurality of different types of signal components. For example, in a preferred embodiment, the plurality of signal components includes a plurality of analog television signals and at least one QAM digital data signal.

The various signal components remain distinct by being confined to predetermined frequency channels. Typically, each frequency channel is 6 MHz wide, however other channel widths may also be used. The frequency channels are located in a downstream passband that typically ranges from about 54 MHz to anywhere from 300 MHz to 1 GHz. The channel plan used in data-over-cable system 10 defines which frequencies are used in the frequency channels and where the carrier frequency is located in each frequency channel. Preferably, system 10 uses a standardized channel plan, such as the IS-6 "standard" channel plan, the IRC channel plan, or the HRC channel plan. However, other channel plans, including non-standardized channel plans, may also be used.

Data-over-cable system 10 may be either a cable-return system or a telephony-return system, depending on how cable modem 22 sends data in the upstream direction, i.e., toward head-end 18. In a cable-return system, which is preferred, cable modem 22 uses one or more upstream channels to transmit data packets over cable network 20 to head-end 18, where they are received at a receiver module 42. The upstream channels are typically located within a downstream passband of from about 5 to 42 MHz. Receiver module 42 sends the upstream signal to a splitter and filter bank 44, which separates the data signals from the television signals and sends the data signals to a demodulation circuit ("DEMOD") 45 in CMTS 30. Demodulation circuit 45 demodulates the data signals to obtain digital data, and a network termination unit 46 in CMTS 30 processes the digital data. Switch/router 32 forwards the digital data from termination unit 46 to network 18 for transmission to the remote computer 14.

In a telephony-return system, cable modem 22 uses PSTN 48 for the upstream data path, as shown in FIG. 1. To allow for telephony-return, head-end 16 is provided with a telephony remote access concentrator ("TRAC") 49, which receives the upstream data from PSTN 48. TRAC 49 forwards the upstream data to switch/router 32, which, in turn, transmits it over backbone network 18.

Figure 2:
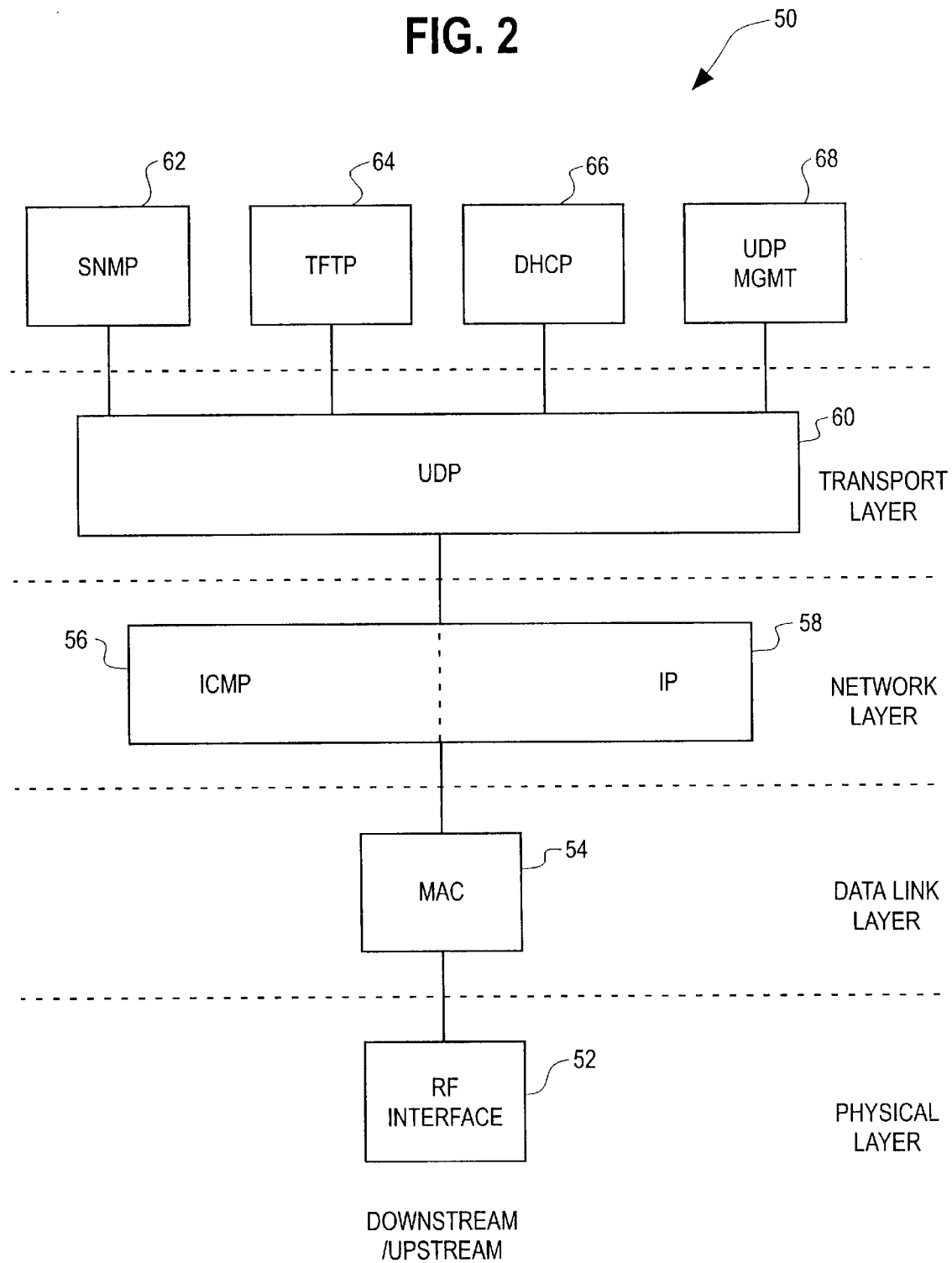
FIG. 2 is a block diagram illustrating a protocol stack for the cable modem in the data-over-cable system of FIG. 1, in accordance with a preferred embodiment of the present invention.

FIG. 2 is a block diagram of a protocol stack 50 illustrating the downstream and upstream protocols that cable modem 22 and CPE 12 use to send and receive data in data-over-cable system 10, in accordance with a preferred embodiment of the present invention. More particularly, protocol stack 50 describes the communication protocols in terms of the Open System Interconnection ("OSI") model, which is well known in the art for describing computer networks. The OSI model consists of seven layers including from lowest to highest, a physical, data-link, network, transport, session, presentation and application layer. The network layer places routing information into the data packets. The data link layer transmits data packets. The physical layer transmits the data packets and overhead as bits over a communication link.

For data transmission over a cable-return data-over-cable system, cable modem 22 is connected to cable network 20 in a physical layer via a radio frequency ("RF") interface 52. In an exemplary preferred embodiment of the present invention, RF interface 52 has an operation frequency range of approximately 54 MHz to 1 GHz and a channel bandwidth of 6 MHz on the downstream channels, as described above. In some of these embodiments, RF interface 52 has an operation frequency range of approximately 5 MHz to 42 MHz for upstream channels. However, other operation frequencies or bandwidths may also be used, and the invention is not limited to these frequencies and bandwidths.

As described above, for downstream transmission, RF interface 52 preferably uses QAM, most preferably QAM-64, which uses sixty-four predefined symbols, or QAM-256, which uses 256 predefined symbols. For upstream transmission, RF interface 52 preferably uses either QAM-16, i.e., QAM using sixteen predefined symbols, or Quadrature Phase-Shift-Keying ("QPSK"). The symbol rate of upstream transmission may be 160, 320, 640, 1,280, or 2,560 kilo-symbols per second ("ksym/sec") for QAM-16, or 160, 320, 640, 1,280, or 2,560 ksym/sec for QPSK. However, other operating frequencies, modulation methods, and symbol rates may alternatively be used. Other information on RF interface 52 can be found in the Institute of Electrical and Electronic Engineers ("IEEE") standard 802.14 for cable modems, which is incorporated herein by reference. IEEE standards can be found today on the World Wide Web at the Universal Resource Locator ("URL") "www.ieee.org." However, other RF interfaces 52 could also be used and the present invention is not limited to interfaces complying with IEEE 802.14.

Referring again to FIG. 2, above RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. Other information can be found in the IEEE 802.14 for cable modems. However, other MAC layer 54 protocols may alternatively be used and the preferred embodiments are not limited to IEEE 802.14 MAC layer protocols.

Above the data-link layer is an Internet Protocol ("IP") layer 58. IP layer 58 roughly corresponds to OSI layer 3, the network layer, but is typically not defined as part of the OSI model. As is known in the art, IP layer 58 is a routing protocol designed to route traffic within a network or between networks. Additional information on IP layer 58 may be found in the Internet Engineering Task Force ("IETF") standard RFC-791, which is incorporated herein by reference.

Also within the network layer of the protocol stack 50, an Internet Control Message Protocol ("ICMP") layer 56 is used for network management. The main functions of ICMP layer 56 include error reporting, reachability testing (e.g., "pinging"), congestion control, route-change notification, performance, and subnet addressing. Since IP 58 is an unacknowledged protocol, datagrams may be discarded and the ICMP 56 is used for error reporting. Additional information on ICMP layer 56 may be found in IETF standard RFC-792, which is incorporated herein by reference.

Above IP layer 58 and ICMP layer 56 is a transport layer with a User Datagram Protocol ("UDP") layer 60. UDP layer 60 roughly corresponds to OSI layer 4, the transport layer, but is typically not defined as part of the OSI model. As is known in the art, UDP layer 60 provides a connectionless mode of communication with datagrams. Additional information on UDP layer 60 may be found in IETF standard RFC-768, which is incorporated herein by reference.

Above the transport layer are a Simple Network Management Protocol ("SNMP") layer 62, a Trivial File Transfer Protocol ("TFTP") layer 64, a Dynamic Host Configuration Protocol ("DHCP") layer 66 and a UDP manager 68. SNMP layer 62 is used to support network management functions. Additional information on SNMP layer 62 may be found in IETF standard RFC-1157, which is incorporated herein by reference. TFTP layer 64 is a file transfer protocol used to download files and configuration information. Additional information on TFTP layer 64 may be found in IETF standard RFC-1350, which is incorporated herein by reference. DHCP layer 66 is a protocol for passing configuration information to hosts on the network. Additional information on DHCP layer 66 may be found in IETF standard RFC-2131, which is incorporated herein by reference. UDP manager 68 distinguishes and routes packets to an appropriate service, as known to those skilled in the art. Although protocol stack 50 shows a preferred layering of protocols for data-over-cable system 10, system 10 could use a different set of protocols, including a greater or fewer number of protocol layers.

Figure 3:
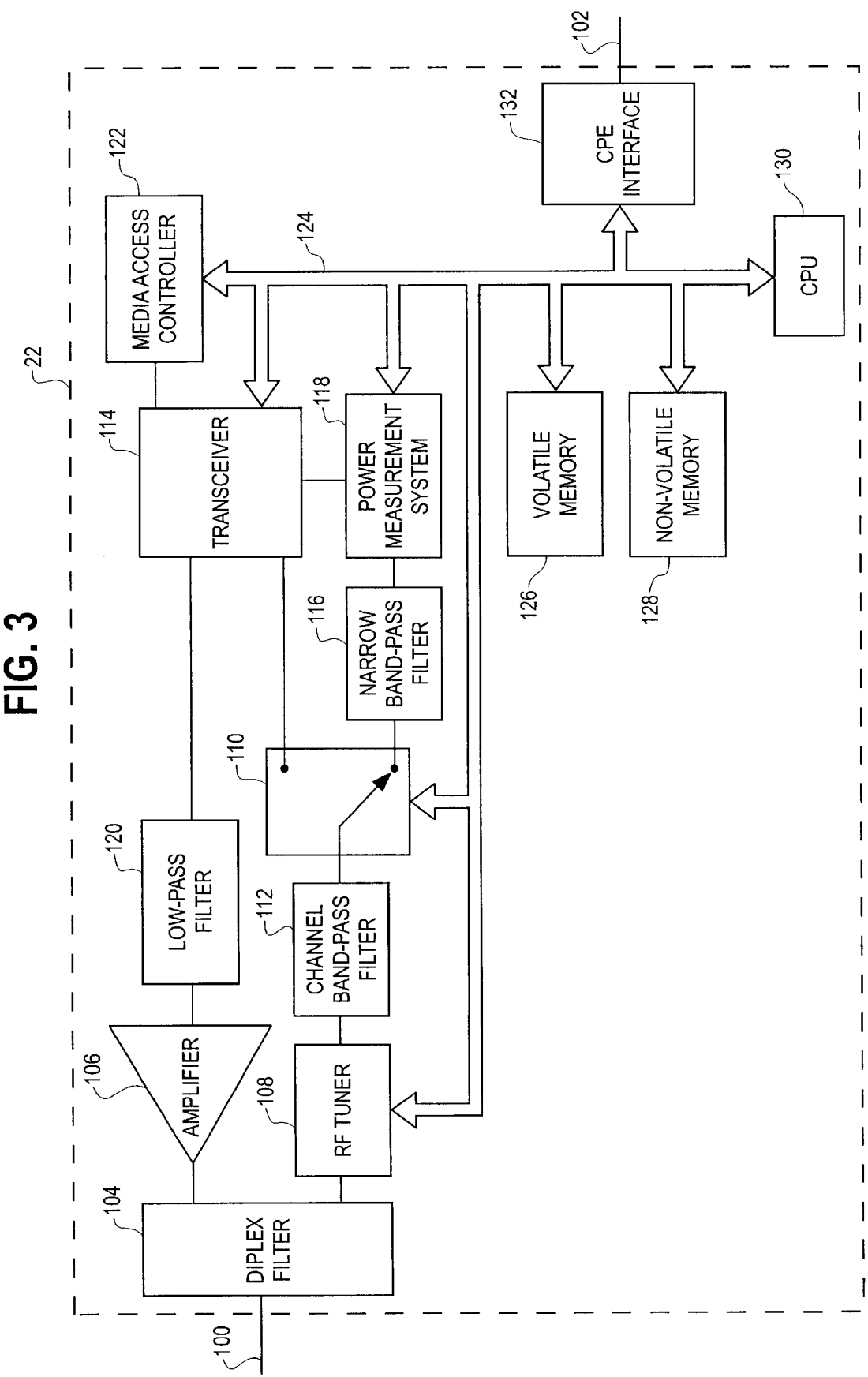
FIG. 3 is a block diagram illustrating the cable modem in the data-over-cable system of FIG. 1, in accordance with a preferred embodiment of the present invention.

FIG. 3 shows a functional block diagram of improved cable modem 22, in accordance with a preferred embodiment of the present invention. In the embodiment of cable modem 22 shown in FIG. 3, cable modem 22 would use cable network 20 to send data in the upstream direction. However, cable modem 22 could also include functional components that are well known in the art to enable it to use. PSTN 48 to send upstream data.

With reference to FIG. 3, cable modem includes a first physical connector 100 for connection to cable network 20, and a second physical connector 102 for connection to CPE 12. Connector 100 will typically be a standard coaxial connector for connection to a coaxial cable network 28 portion of cable network 20. Connector 102 can take a variety of forms, depending on the communication port that CPE 12 uses for connection to cable modem 22. In one preferred embodiment, CPE 12 has an Ethernet connection to cable modem 22, in which case connector 102 is preferably an RJ-45 connector. In another preferred embodiment, CPE 12 uses a universal serial bus ("USB") for connection to cable modem 22. Alternatively, CPE 12 may be connected to cable 22 through a serial port, a parallel port, or other type of communications port.

Connector 100 is connected to a diplex filter 102, which, in turn, is connected to an amplifier 106 and an RF tuner 108. RF tuner 108 is connected to a switch 110 via a channel band-pass filter 112. Switch 110 has a first position, in which filter 112 is connected to a transceiver 114, and a second position, in which filter 112 is connected to a narrow band-pass filter 116. Narrow band-pass filter 116 is also connected to a power measurement system 118, which is typically either connected to, or a part of, transceiver 114. Transceiver 114 is also connected to amplifier 106 via a low-pass filter 120.

These components comprise a radio frequency ("RF") section of cable modem 22, enabling cable modem 22 to transmit and receive signals using frequencies that may range from a few MHz to one GHz, or more. Typically, upstream signals are confined to a lower part of the frequency range, such as 5 to 42 to MHz, while the downstream channels use the higher part of the frequency range, typically frequencies about 54 MHz or greater.

Transceiver 114 includes a modulation functionality to modulate digital data, typically using QAM or QPSK, to provide an upstream signal in any one of a plurality of predetermined upstream frequency channels. Transceiver 114 sends the modulated upstream signal to low-pass filter 120, which filters out any spurious high-frequency components. The output of filter 120 is amplified by amplifier 106. Typically, the gain of amplifier 106 may be controlled by transceiver 114 or by some other component of cable modem 22.

Diplex filter 104 directs the output of amplifier 106 to connector 100. More particularly, diplex filter 104 includes a low-pass filter connected to a high-pass filter to provide a low-pass output and a high-pass output. The low-pass output of diplex filter 104 is connected to connector 100, and the high-pass output of diplex filter 104 is connected to RF tuner 108. In this way, diplex filter 104 preferentially directs the lower-frequency upstream signal from amplifier 106 to connector 100 and preferentially directs the higher-frequency downstream signal from connector 100 to RF tuner 108.

RF tuner 108 is tunable to select a range of incoming frequencies from diplex filter 104 for heterodyning to a range of frequencies centered about a fixed intermediate frequency RF tuner 108 typically achieves this result by using a non-linear device to mix the incoming frequencies with the output of a tunable variable frequency oscillator, in a manner well-known in the art. A typical intermediate frequency is 43.75 MHz, though other intermediate frequencies could be used.

With switch 110 in the first (upper) position, channel band-pass filter 112 filters the output of RF tuner 108 to provide a filtered output for transceiver 114. Channel band-pass filter 112 preferably has a center frequency corresponding to the intermediate frequency used by RF tuner 108 and a bandwidth compatible with the bandwidth of the downstream frequency channels, e.g., 6 MHz. Filter 112 is preferably provided as a surface acoustic wave ("SAW") filter. However, other types of band-pass filters could be used.

With switch 110 in the second (lower) position, narrow band-pass filter 116 filters the output of filter 112 to provide a filtered output for power measurement system 118. Filter 116 has a bandwidth that is substantially narrower than the bandwidth of filter 112.

In this way, RF tuner 108 switch 110, channel band-pass filter 112, and narrow band-pass filter 116 together act as a tunable frequency selection system that allows cable modem 22 to selectively receive a band of frequencies from the downstream signal sent over cable network 20. Moreover, through the use of switch 110, this frequency selection system is selectively operable at a first bandwidth, defined by band-pass filter 112, and at a second bandwidth, defined by band-pass filter 116. Alternatively, filters 112 and 116 maybe viewed as defining first and second frequency selection systems. Many different modifications to and configurations of this frequency selection system are possible. For example, the input of narrow band-pass filter 116 may be connected to the output of RF tuner 108, instead of to the output of channel band-pass filter 112. Additionally, although FIG. 3 shows only one narrow band-pass filter, namely filter 116, switch 110 may switch between a plurality of band-pass filters, each having a distinct bandwidth narrower than that of channel band-pass filter 112.

With the bandwidth of filter 112 corresponding to the bandwidth of the downstream channels, RF tuner 108 and filter 112 together enable cable modem 22 to selectively receive one of the predetermined downstream channels used in data-over-cable system 10. Additionally, with the use of narrow band-pass filter 116, cable modem is able to selectively receive only part of the frequency range of one of the downstream channels.

With switch 110 in its first position, the output of filter 112, preferably a single downstream channel, is sent to transceiver 114, wherein a demodulation functionality demodulates it to obtain the digital data. The demodulation functionality needed in transceiver 114 will depend on the type of modulation used for the downstream digital channels. Thus, transceiver 114 is typically able to demodulate QAM-64 and/or QAM-256 signals.

As noted above, some embodiments of data-over-cable system 10 may provide only a single digital data channel out of a large number of predetermined frequency channels. In order to find a useable digital data channel, during an initialization procedure, cable modem 22 uses intra-channel power measurements to distinguish digital data channels from- analog television channels, based on their differing spectral profiles, as described in more detail below. Cable modem 22 uses narrow band-pass filter 116 to make these intra-channel power measurements. Filter 116 has a bandwidth substantially less than the bandwidth of the downstream channels in order to be able to select a portion of a given channel for power measurement. For example, for channels that are 6 MHz wide, filter 116 preferably has a bandwidth in the range of about 100 kHz to about 1 MHz, with a bandwidth of about 300 kHz being most preferred.

Switch 110 is placed in its second position when cable modem makes these power measurements. In this position, narrow band-pass filter 116 receives the filter signal from channel band-pass filter 112. Power measurement system 118 then measures the power level of the filtered output of narrow band-pass filter and produces a power level signal that is indicative of the measured power level.

In addition to having an RF section, cable modem 22 also has a digital section. This digital section includes a media access controller ("MAC") 122 that sends digital data to and receives digital data from transceiver 114. In particular, transceiver 114 forwards to MAC 122 the digital data obtained from demodulating downstream signals, and transceiver 114 modulates the digital data received from MAC 122 to provide upstream signals. MAC 122 performs the functions of MAC layer 54, as described above. MAC 122, in turn, sends and receives digital data over a digital data bus 124.

Also connected to data bus 124 are a volatile memory 126, a non-volatile memory 128, a central processing unit ("CPU") 130, and a CPE interface 132. Volatile memory 126 may include dynamic random access memory ("DRAM") and/or static random access memory ("SRAM") devices. Non-volatile memory 128 typically includes flash memory devices and may also include read only memory ("ROM"). Non-volatile memory 128 may store machine language instructions or other information used by CPU 130. CPU 130 typically includes a microprocessor. CPE interface 132, which is connected to physical connector 102, includes the components needed to interface with CPE 12, depending on the type of communication port that CPE 12 uses to connect to cable modem 22. For example, if CPE 12 has an Ethernet connection to cable modem 22, then CPE interface 132 would include an Ethernet interface. If CPE 12 uses a universal serial bus ("USB") to connect to cable modem 22, then CPE interface 132 would comprise a USB transceiver.

Preferably, data bus 124 is also connected to RF tuner 108, switch 110, power measurement system 118, and transceiver 114, so that CPU 130 can control these devices with digital commands and/or receive digital data from the devices. In particular, CPU 130 can use digital commands to tune RF tuner 108, to control switch 110, and to control the operation of transceiver 114. Additionally, power measurement system 118 is able to provide a digital signal indicative of the measured power level and to send to the digital signal to CPU 130 over data bus 124. CPU 130 also controls the flow of digital data from CPE interface 132 to MAC 122 for transmission in the upstream direction, and it controls the flow of digital data from MAC 122 to CPE 132, i.e., the digital data received from cable network 20.

The blocks shown in FIG. 3 are intended to illustrate the functional components, rather than the physical components, of an exemplary cable modem 22. Thus, a functional component shown in FIG. 3 may be implemented by a plurality of physical components. Additionally, a single physical component may perform the functions of a plurality of the functional components shown in FIG. 3. For example, the BCM3300 cable modem chip, sold by Broadcom Corporation, Irvine, Calif., may be used to provide the transceiver 114, the power measurement system 118, and the media access controller 122 shown in FIG. 3.

During the initialization process, i.e., when cable modem 22 is first used with data-over-cable system 10, cable modem 22 attempts to find a useable digital signal component of the downstream signal on cable network 20. Cable modem 22 distinguishes the digital signal components from the analog television signal components on the basis of their differing spectral profiles.

Figure 4:
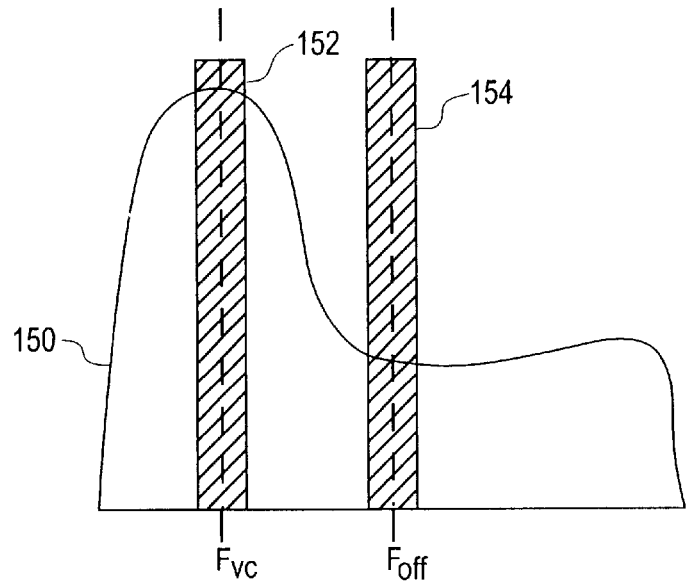
FIG. 4 is a diagram illustrating the power spectrum of a typical analog television signal transmitted in the downstream direction in the data-over-cable system of FIG. 1, in accordance with a preferred embodiment of the present invention.

With reference to FIG. 4, curve 150 illustrates a typical spectral profile, i.e., power as a function of frequency, for an analog television signal in a given frequency channel. Thus, curve 150 in FIG. 4 extends from the lower channel edge to the upper channel edge. In an analog television signal, most of the signal power is in the visual carrier frequency, $F_{VC}$, and adjacent frequencies. Thus, the spectral profile for an analog television signal includes a prominent peak at $F_{VC}$, such as shown in curve 150. In the NTSC and PAL formats, $F_{VC}$ is located at 1.25 MHz above the lower channel edge. The next most prominent component in a typical analog television signal is the audio carrier, which is typically about 4.5 MHz above the visual carrier. The power level of the audio carrier is typically about 10 to 15 dB below the visual carrier.

As noted above, channel band-pass filter 112 preferably has a bandwidth compatible with the bandwidth of the predetermined frequency channels. Thus, with filter 112 defining the bandwidth of cable modem 22, cable modem would receive substantially all of the analog television signal represented by curve 150 in FIG. 4, when cable modem 22 tunes to that channel. However, narrow band-pass filter 116 has a substantially narrower bandwidth than that of filter 112. Thus, with filter 116 defining the bandwidth of cable modem 22, cable modem 22 would receive only part of the analog television signal represented by curve 150 in FIG. 4. Shaded region 152, which is shown in FIG. 4 centered about $F_{VC}$, represents the portion of the analog television signal that cable modem 22 would receive when it tunes to frequency $F_{VC}$, using filter 116. Similarly, shaded region 154 shown in FIG. 4 centered about $F_{off}$, represents the portion of the analog television signal that cable modem 22 would receive when it tunes to a frequency offset from $F_{VC}$.

Figure 5:
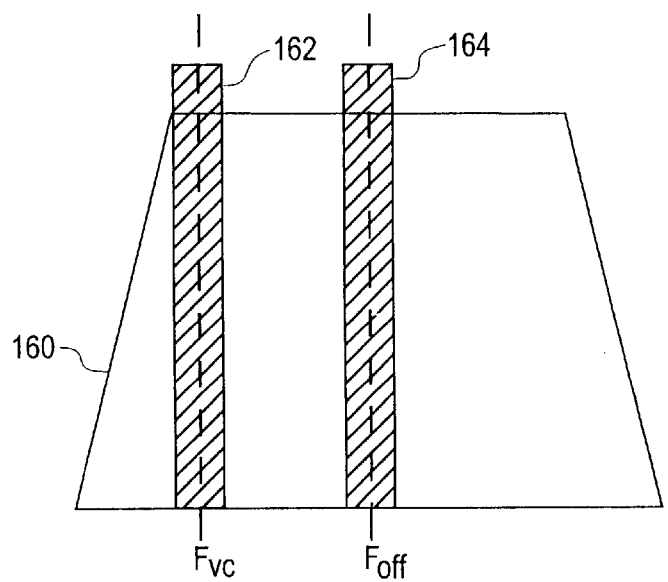
FIG. 5 is a diagram illustrating the power spectrum of a typical analog television signal transmitted in the downstream direction in the data-over-cable system of FIG. 1, in accordance with a preferred embodiment of the present invention.

However, a QAM signal that uses 64 or 256 symbols has a spectral profile very different from that of an analog television signal. In particular, a typical QAM-64 or QAM-256 signal will not have distinct peaks; instead, it will have a nearly flat-spectral profile throughout most of the channel, except for rolloff at the edges. With reference to FIG. 5, curve 160 illustrates the spectral profile of a typical QAM-64 signal in a given frequency channel. The spectral profile of a QAM-256 signal would be similar. Shaded region 162 shown in FIG. 5 centered about $F_{VC}$, represents the portion of the QAM signal that cable modem 22 would receive when it tunes to frequency $F_{VC}$, using filter 116. Similarly, shaded region 164, centered about $F_{off}$, represents the portion of the QAM signal that cable modem 22 would receive when it tunes to a frequency offset from $F_{VC}$.

Cable modem 22 exploits the difference between the spectral profiles of QAM signals and analog television signals to find a useable digital channel during initialization. More particularly, cable modem 22 uses narrow band-pass filter 116 to characterize the spectral profiles of the signal components defined by different frequency channels. Good candidates for digital data channels are channels that are found to have a QAM spectral profile.

The initialization process begins when cable modem is connected to cable network 20 in data-over-cable system 10 for the first time. The initialization process is typically controlled by CPU 130, which typically executes machine language instructions stored in non-volatile memory 128. During much of this initialization process, CPU 130 controls switch 110 to operate in the second position, so that narrow filter 116 is used, and CPU 130 tunes RF tuner 108 so as to select which frequencies cable modem 22 receives. For each selected frequency, CPU 130 reads the signals provided by power measurement system 118 to obtain the power level of the output of filter 116 and, thus, the power of the selected slice of the frequency spectrum.

A relevant part of the cable modem initialization process typically includes three phases. In the first phase, cable modem 22 attempts to determine the channel plan used by data-over-cable system 10. However, as described in more detail below, this first phase may be omitted. In the second phase, cable modem 22 classifies one or more of the channels to find one or more digital channels. In the third phase, cable modem 22 demodulates a digital channel and attempts to synchronize the QAM signal timing and the digital data.

In the first phase of the initialization process, cable modem 22 typically attempts to determine which channel plan is used by system 10. This is most conveniently accomplished by measuring the power levels at two or more frequencies that correspond to visual carrier frequencies used in different channel plans. The highest power level measurement would then indicate the presence of the visual carrier frequency and, thus, would indicate that system 10 uses the channel plan that would have a visual carrier at that frequency.

Figure 6:
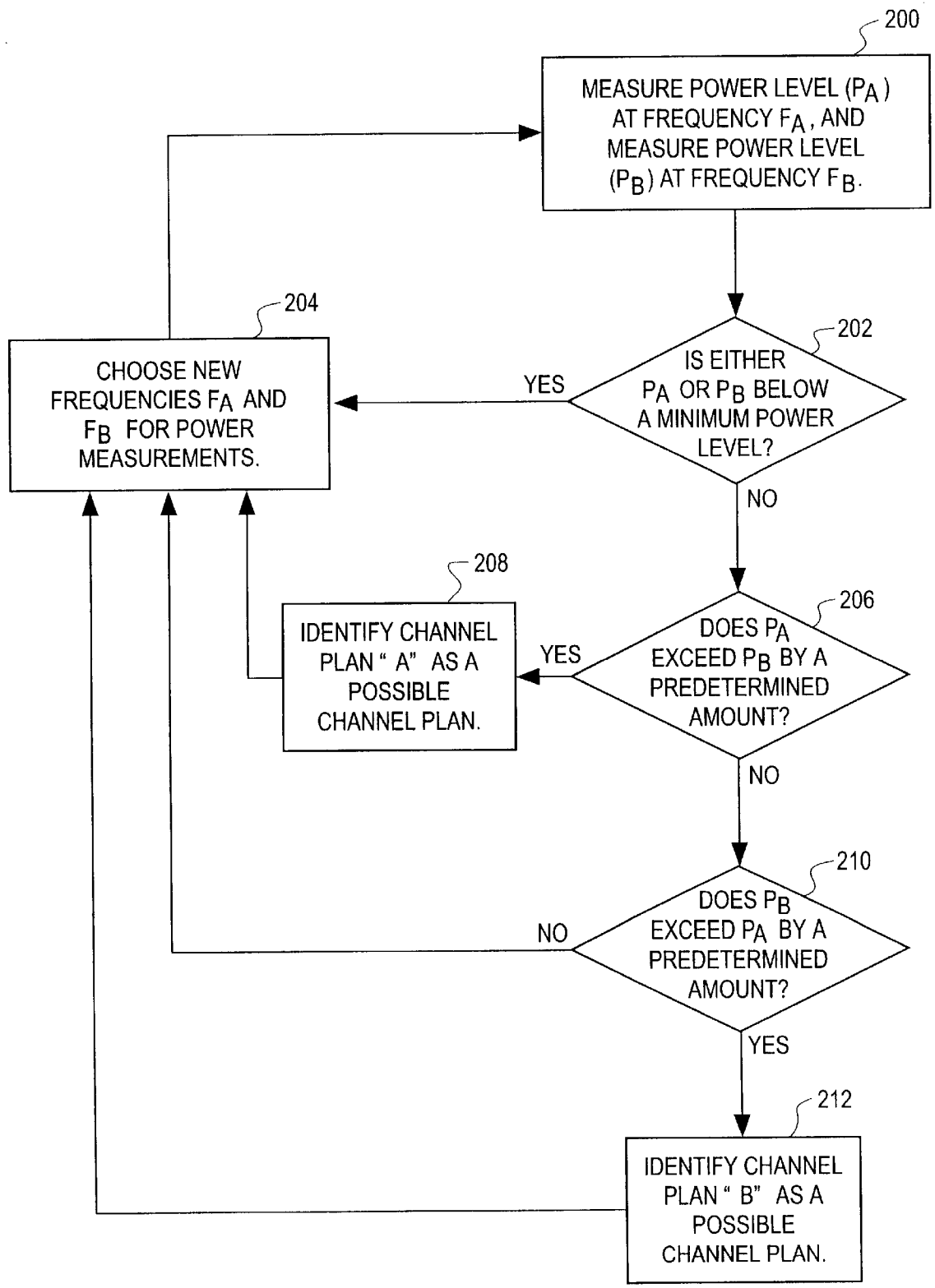
FIG. 6 is a flow chart illustrating the process of determining an applicable channel plan used by the cable modem of FIG. 3, in accordance with a preferred embodiment of the present invention.

This process is summarized in the flowchart of FIG. 6 for the case where two channel plans are evaluated at a time. In step 200, RF tuner 108 is tuned to receive two distinct frequencies in succession, $F_A$ and $F_B$. Power measurement system 118 measures the power levels of the filtered signals from filter 116 at these two frequencies to yield corresponding measured power levels $P_A$ and $P_B$. Preferably, these frequencies, $F_A$ and $F_B$, are chosen such that they can be used to distinguish their corresponding channel plans, i.e., channel plan "A" and channel plan "B." For example, the visual carrier for "Channel 2" is located at 55.25 MHz in the standard and IRC channel plans, but it is located at 54 MHz in the HRC channel plan. Thus, power measurements at 55.25 MHz and at 54 MHz can be used to determine where the visual carrier for "Channel 2" lies and, thus, which channel plan is used. If cable modem 22 measures a much higher power at 55.25 MHz, then either the standard or IRC channel plans may be applicable. But if cable modem 22 measure a much higher power at 54 MHz, then the HRC channel plan may be applicable.

However, such power measurements are meaningful only if a signal is actually present in the channel. Thus, in step 202, cable modem 22 checks whether $P_A$ and $P_B$ exceed a minimum power level that would be expected if a signal were actually present in the channel. If either $P_A$ or $P_B$ are below this minimum power level, then new frequencies should be chosen for power measurement, as indicated at step 204 in FIG. 6, and the process would be started anew. Otherwise, cable modem 22 would proceed with a comparison of the measured power levels. Thus, in step 206, cable modem 22 checks to see whether $P_A$ exceeds $P_B$ by at least a predetermined amount. If it does, then in step 208, cable modem 22 would provisionally conclude that channel plan "A" would be applicable. However, cable modem 22 may check this channel plan assignment by making additional measurements. Thus, from step 208, cable modem 22 may proceed to step 204, as shown in FIG. 6, to choose a new set of frequencies for power measurement. If $P_A$ does not exceed $P_B$ by at least a predetermined amount, then cable modem 22 would proceed to step 210, in which cable modem 22 determines whether $P_B$ exceeds $P_A$ by at least a predetermined amount. If $P_B$ does exceed $P_A$ by at least a predetermined amount, then, in step 212, cable modem 22 should provisionally conclude that channel plan "B" was applicable. However, cable modem 22 may proceed from step 212 to step 204 in order to take additional, confirming, power measurements. If one of the power measurements is not greater than the other by a predetermined amount, then it would indicate that the frequencies are not useful to distinguish the channel plans "A" and "B." Cable modem 22 would then proceed to step 204 to choose new frequencies for power measurement.

Although the process shown in FIG. 6 and described above compares only two channel plans at a time, the process may be generalized to take power measurements at three or more frequencies so as to compare three or more channel plans at a time. Alternatively, the process of FIG. 6 may be done successively so as to compare channel plans "A" and "B" and then to compare what is found to be the applicable channel plan to channel plan "C." For example, in the "Channel 2" power measurement described above to distinguish between the standard and IRC channel plans on the one hand and the HRC channel plan on the other, if the HRC channel plan is ruled out, then additional measurements could be taken to distinguish between the standard and IRC plans. For example, measurements at 73.2625 MHz and 79.2625 MHz could be used to distinguish between the standard and IRC channel plans. Preferably, cable modem 22 stores the results of the channel plan determination in non-volatile memory 128, so that the results can be used the next time cable modem 22 is powered up.

Once the channel plan has been determined, cable modem 22 then proceeds to the next phase of the initialization process. In this phase, cable modem 22 tunes to different channel in the channel plan and evaluates whether each selected channel is an analog channel (i.e., contains an analog television signal), a digital channel (i.e., contains a QAM signal), or is inactive. Cable modem 22 performs this evaluation based on the spectral profile of any signal component present in the channel. The spectral profile is, in turn, characterized by power measurements taken at frequencies located within the channel using narrow band-pass filter 116.

Figure 7:
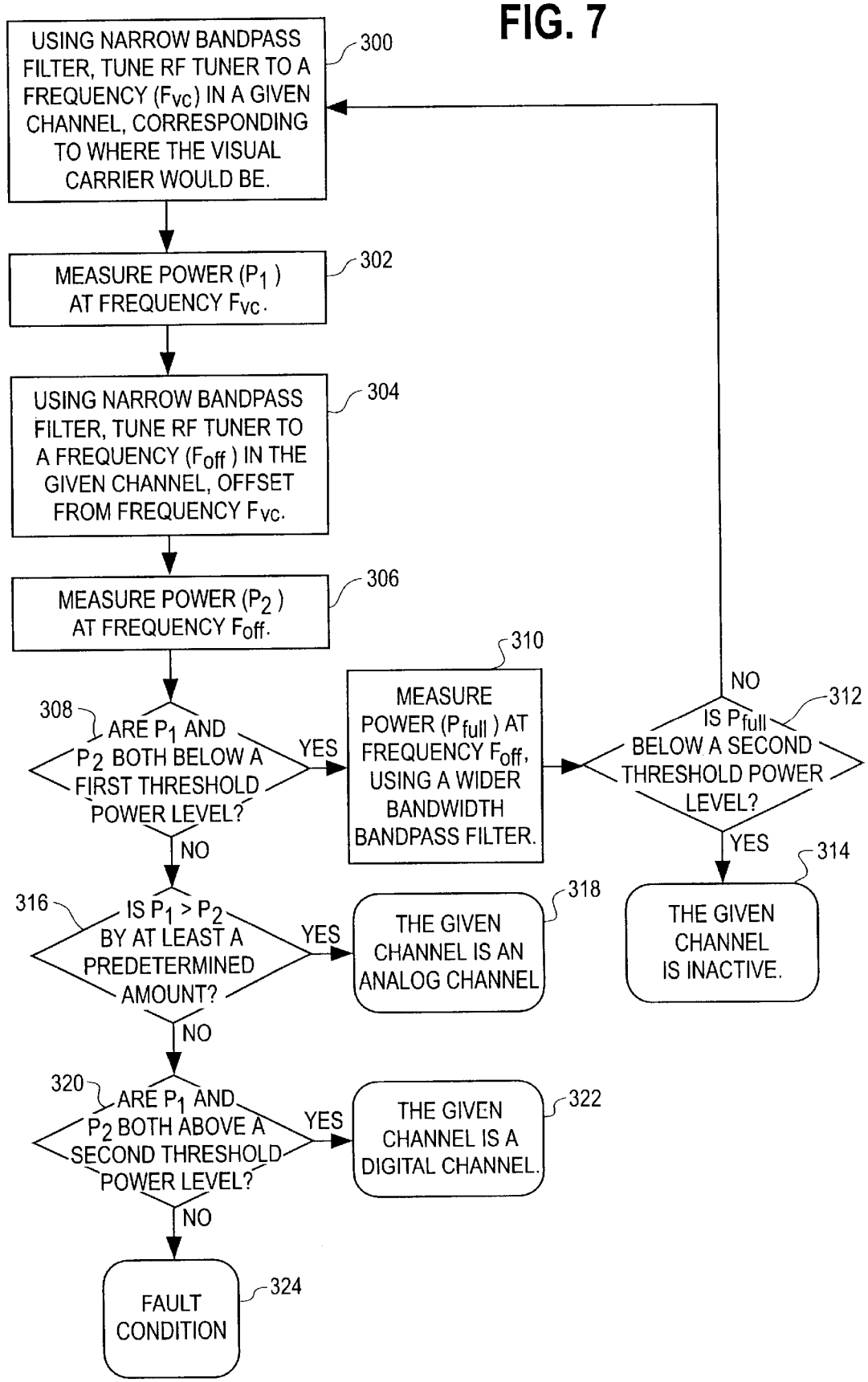
FIG. 7 is a flow chart illustrating the process used by the cable modem of FIG. 3 to classify downstream channels, in accordance with a preferred embodiment of the present invention.

The flowvchart of FIG. 7 summarizes the steps-that may be used to perform-this phase of the initialization process, in accordance with a preferred embodiment of the present invention. In step 300, cable modem 22 tunes to a frequency, $F_{VC}$, in a given channel corresponding to the frequency where the visual carrier would be located if the given channel contained an analog television signal. Specifically, CPU 130 controls switch 110 so that narrow band-pass filter 116 is used, and CPU 130 tunes RF tuner 108 to the frequency $F_{VC}$. Next, in step 302, cable modem 22 measures the power level, $P_1$, of the filtered signal from filter 116, typically by CPU 130 reading the power signal from power measurement system 118. In step 304, cable modem 22 tunes RF tuner 108 to a frequency, $F_{off}$, which is a frequency within the given channel that is offset from $F_{VC}$. Preferably, $F_{off}$ is located about 1 to 3 MHz above $F_{VC}$ and is most preferably located at the middle of the channel. Thus, for the typical case of a 6 MHz wide channel in which $F_{VC}$ is 1.25 MHz above the lower channel edge, $F_{off}$ is most preferably located about 3.0 MHz above the lower channel edge, or about 1.75 MHz above $F_{VC}$. Then, in step 306, cable modem 22 measures the power level, $P_2$, of the filtered signal from filter 116.

Cable modem 22 can then classify the given channel on the basis of these two measured power levels, $P_1$ and $P_2$. The concept behind the power level comparisons is illustrated in FIGS. 4 and 5. Curve 150 in FIG. 4 shows a representative spectral profile for an analog television signal. Shaded region 152 shows the band of frequencies centered about $F_{VC}$ that would be included in the measurement of power level $P_1$ when narrow band-pass filter 116 is used. Similarly, shaded region 154 shows the band of frequencies centered about $F_{off}$ that would be included in the measurement of power level $P_2$ when narrow band-pass filter 116 is used. As illustrated in FIG. 4, the frequencies included in shaded region 152 are at a much higher power level than the frequencies included in shaded region 154. Thus, FIG. 4 illustrates the principle that, for a typical analog television signal, $P_1$, the power level at $F_{VC}$, will be much greater than $P_2$, the power level at $F_{off}$.

In FIG. 5, curve 160 shows a representative spectral profile for a QAM signal. Shaded region 162 shows the band of frequencies centered about $F_{VC}$ that would be included in the measurement of power level $P_1$ when narrow band-pass filter 116 is used, and shaded region 164 shows the band of frequencies centered about $F_{off}$ that would be included in the measurement of power level $P_2$ when narrow band-pass filter 116 is used. As shown in FIG. 5, the power levels of the frequencies included in shaded regions 162 and 164 are similar. Thus, for a typical QAM signal, $P_1$, the power level at $F_{VC}$, would be about the same as $P_2$, the power level at $F_{off}$. In fact, $P_1$ may be somewhat less than $P_2$, because of the rolloff of the QAM signal near the lower channel edge. In any event, the relative magnitudes of $P_1$ and $P_2$ will differ greatly between analog television signals and QAM signals, so that a comparison of $P_1$ and $P_2$ can be used to distinguish these two signal types.

However, rather than containing an analog television signal or a QAM signal, a given channel may also be inactive, i.e., no signal may be present in the given channel. Thus, in step 308, cable modem 22 checks whether $P_1$ and $P_2$ are both below a first threshold level. If they are, then cable modem 22 may classify the given channel as inactive. Preferably, however, cable modem 22 makes a confirming measurement in step 310 by using a wider bandwidth filter, such as channel band-pass filter 112, to measure the power level, $P_{full}$, of the frequencies centered about $F_{off}$. In step 312, cable modem 22 checks whether $P_{full}$ is below a second threshold level. If it is, then cable modem 22 may classify the given channel as inactive in step 314. If, however, $P_{full}$ is above this second threshold level, then cable modem 22 preferably returns to step 300 to repeat the measurement process for the given channel, as shown in FIG. 7. Alternatively, cable modem 22 may indicate a fault condition, which may be handled as described below.

If $P_1$ and $P_2$ are not both below the first threshold level, then, in step 316, cable modem checks whether $P_1$ exceeds $P_2$ by at least a predetermined amount, as would be expected for an analog television signal. This predetermined amount is preferably in the range of 5 dB to 20 dB and is most preferably about 10 dB. If $P_1$ is found to exceed $P_2$ by a sufficient amount, then cable modem 22 classifies the given channel as an analog channel in step 318. Otherwise, in step 320, cable modem 22 checks whether $P_1$ and $P_2$ both exceed a second threshold power level, as would be expected for a QAM signal. If $P_1$ and $P_2$ are sufficiently high, then cable modem 22 classifies the channel as a digital channel in step 322. Otherwise, cable modem 22 may indicate a fault condition in step 324.

When cable modem 22 encounters a fault condition, it preferably demodulates the indeterminate channel to determine whether it is a digital data channel. Alternatively, cable modem 22 may classify the given channel as "unclassifiable" and/or perform an error handling routine. As part of an error handling routine, cable modem 22 may, for example, provide an indication to the user that an error has occurred during the initialization process, repeat the power measurements for the given channel using the same parameters, or repeat the power measurements for the given channel using different measurement parameters.

Once a given channel has been classified, cable modem 22 may classify another channel in the channel plan. The channel classification process may continue until, for example, cable modem 22 has classified all the channels in the channel plan, has classified a predetermined number of channels in the channel plan, or has found a digital channel.

After cable modem 22 has found one or more digital channels, it may proceed to the third phase of the initialization process. In this phase, cable modem 22 tunes to the digital channel and selectively receives it with switch 110 in the first position, so that the full bandwidth of channel band-pass filter 112 is used. Cable modem 22 then demodulates the signal in this digital channel, attempts to synchronize the QAM signal timing, and attempts to synchronize the framing and packetization that may be present in the digital data. If this process is successful, then cable modem 128 has found a valid downstream data channel that it can use, and it stores the channel information in non-volatile memory 128 for later use. If the digital channel is found not to be a valid data channel, then cable modem 22 may attempt to demodulate any other digital channels it may have found.

In some cases, however, cable modem 22 may not be able to determine an applicable channel plan in the manner illustrated in FIG. 6 and described above. In particular, while the use of either the "standard," IRC, or HRC channel plans is typical in North America, the channel plans used in other countries may conform to different standards and may use channel widths greater than 6 MHz. Additionally, data-over-cable system 10 may use a non-standard channel plan. When cable modem 22 is unable to determine an applicable channel plan, it may, instead take a representative number of power measurements, using narrow band-pass filter 116, at frequencies spanning the entire anticipated downstream bandwidth. For example, cable modem 22 may take power measurements every 500 kHz MHz, starting at about 50 MHz, to obtain a sequence of power measurements, $P_i$. Cable modem 22 would then analyze the power measurements $P_i$ to try to find a sequential set of $P_i$ that are all at about the same level, which may indicate that the wide flat region characteristic of a QAM signal has been sampled. For example, cable modem 22, may find that a number of the sequential power measurements, such as $P_k$, $P_{k+1}$, $P_{k+2}$, $P_{k+3}$, differ from each other by less than a predetermined amount. This may indicate the presence of a digital channel. In particular, for 6 MHz wide channels, where cable modem 22 takes power measurements every 500 kHz, four to five of the sequential power measurements would typically fall within the flat portion characteristic of a QAM signal.

When cable modem 22 finds such a sequence, it preferably tunes to a frequency approximating the center frequency of the channel in order to receive the digital signal in the channel. The approximate center frequency may be taken as the middle frequency of the sequential power measurements found to be at about the same level. Alternatively, cable modem 22 would may take additional power measurements in this frequency range to map out the signal's spectral profile and to find the center frequency (which is where the carrier frequency is in a QAM signal). Once at the approximate center frequency, cable modem 22 uses its full bandwidth, defined by channel band-pass filter 112, to selectively receive the QAM signal, which would include at least some of the frequencies previously sampled to obtain power measurements $P_k$, $P_{k+1}$, $P_{k+2}$, and $P_{k+3}$. Transceiver 114 would then demodulate the signal to obtain the digital data, and cable modem 22 would attempt data synchronization, as described above.

The approach of the present invention can be much more efficient than other approaches that are used for initializing a cable modem, because instead of demodulating a large number of channels, most of which are likely to be analog television channels rather than digital data channels, the cable modem simply takes power measurements to pinpoint the channels that are likely to carry useable digital data. Additionally, it is typically faster to take power measurements than to attempt QAM signals. Moreover, the approach of the present invention need not assume any channel plan at all, as the cable modem can identify digital data channels on the basis of power measurements.

An exemplary embodiment of the present invention has been illustrated and described. It will be understood, however, that changes and modifications may be made to the invention without deviating from the spirit and scope of the invention, as defined by the following claims.

What is claimed is:

1. In a cable telecommunications system in which a transmitter transmits a signal over a cable network to a receiver, said signal comprising a plurality of signal components, each one of said signal components being defined by a distinct frequency range, a method for selectively receiving a target signal component from among said plurality of signal components, said method comprising the steps of:

obtaining a first plurality of power measurements for a first signal component of said signal, said first signal component being defined by a first frequency range, said first plurality of power measurements including a first power measurement and a second power measurement, wherein obtaining a plurality of power measurements includes the steps of:

(a) tuning a first frequency selection system to a first center frequency, said first center frequency being within said first frequency range;

(b) said first frequency selection system providing a first filtered signal from a first band of frequencies of said signal centered about said first center frequency;

(c) measuring the power of said first filtered signal to obtain said first power measurement;

(d) tuning said first frequency selection system to a second center frequency, said second center frequency being within said first frequency range;

(e) said first frequency selection system providing a second filtered signal from a second band of frequencies of said signal centered about said second center frequency; and (f) measuring the power of said second filtered signal to obtain said second power measurement; and if said first plurality of power measurements satisfy predetermined criteria, identifying said first signal component as being said target signal component.

2. The method of claim 1, further comprising the step of:

if said first plurality of power measurements do not satisfy said predetermined criteria, obtaining a second plurality of power measurements for a second signal component, said second signal component being defined by a second frequency range.

3. The method of claim 2, further comprising the step of:

if said second plurality of power measurements satisfy said predetermined criteria, identifying said second signal component as being said target signal component.

4. The method of claim 1, wherein said first plurality of power measurements satisfies said predetermined criteria if said first and second power measurements are both greater than a threshold power level.

5. The method of claim 1, wherein said target signal component comprises a carrier modulated by a digital signal using quadrature amplitude modulation (QAM).

6. The method of claim 5, wherein at least one of said plurality of signal components comprises a carrier modulated by a visual signal using amplitude modulation (AM).

7. The method of claim 1, wherein said first frequency selection system has a bandwidth substantially less than the width of said frequency range of said first signal component.

8. The method of claim 7, further comprising the steps of:

tuning a second frequency selection system to a working center frequency, said working center frequency being within the frequency range of said target signal component; and said second frequency selection system providing a filtered target signal from a working band of frequencies of said signal centered about said working center frequency, said working band of frequencies corresponding to the frequency range of said target signal component.

9. The method of claim 8, further comprising the step of: demodulating said filtered target signal.

10. In a data-over-cable system in which a signal is transmitted over a cable network to a cable modem, said signal comprising a plurality of signal components defined by a plurality of predetermined frequency channels, said frequency channels having a channel bandwidth, said frequency channels including at least one analog channel and at least one digital channel, said signal components including at least one analog signal component having a first spectral profile and at least one digital signal component having a second spectral profile, said analog signal components being defined by analog channels, said digital signal components being defined by digital channels, a method for selectively receiving one of said digital signal components, said method comprising the step of:

classifying a first channel based on the spectral profile of any signal component present in said first channel, said first channel being one of said plurality of frequency channels, wherein classifying said first channel comprises the steps of:

(a) tuning a first frequency selection system to a first center frequency being within said first channel, said first frequency selection system having a bandwidth substantially less than said channel bandwidth;

(b) said first frequency selection system providing a first filtered signal from a first band of frequencies of said signal centered about said first center frequency;

(c) measuring the power of said first filtered signal to obtain a first power measurement;

(d) tuning said first frequency selection system to a second center frequency, said second center frequency being within said first channel;

(e) said second frequency selection system providing a second filtered signal from a second band of frequencies of said signal centered about said second frequency;

(f) measuring the power of said second filtered signal to obtain a second power measurement; and (g) identifying said first channel as a digital channel if said first and second power measurements are both greater than a first threshold power level.

11. The method of claim 10, further comprising the step of:

identifying said first channel as an analog channel if said first power measurement exceeds said second power measurement by a predetermined amount.

12. The method of claim 11, further comprising the step of:

identifying said first channel as inactive if said first and second power measurements are both less than a second threshold power level.

13. The method of claim 10, further comprising the step of:

if said first channel is identified as a digital channel, tuning a second frequency selection system to said first channel to selectively receive the digital signal component defined by said first channel, said second frequency selection system having a bandwidth compatible with said channel bandwidth, otherwise:

classifying a second channel based on the spectral profile of any signal component present in said second channel, said second channel being one of said plurality of frequency channels.

14. The method of claim 10, wherein said one digital signal component comprises a carrier modulated by a digital signal using quadrature amplitude modulation (QAM).

15. The method of claim 14, wherein said at least one analog signal component comprises a carrier modulated by a visual signal using amplitude modulation (AM).

16. A cable modem for selectively receiving a digital component from a signal transmitted over a cable network, said signal having a plurality of signal components, said cable modem comprising:
   a tunable frequency selection system for providing a filtered signal from a selected band of frequencies of said signal, said frequency selection system being operable at a first bandwidth and at a second bandwidth, said second bandwidth being narrower than said first bandwidth, said frequency selection system including a first band-pass filter and a second band-pass filter, said first band-pass filter defining said first bandwidth and said second band-pass filter defining said second bandwidth;
   a demodulator for obtaining a digital signal by demodulating said filtered signal from said frequency selection system; and
   a power measurement system for providing a power level signal indicative of a power level associated with said filtered signal from frequency selection system.

17. The cable modem of claim 16, wherein said demodulator is able to demodulate quadrature amplitude modulated (QAM) signals.

18. The cable modem of claim 16, further comprising a central processing unit for controlling said frequency selection system.

19. The cable modem of claim 18, wherein said central processing unit controls whether said frequency selection system operates at said first bandwidth or at said second bandwidth.

20. The cable modem of claim 19, wherein said frequency selection system is tunable in response to commands from said central processing unit.

21. The cable modem of claim 20, wherein said central processing unit is able to receive power level signals from said power measurement system.

22. The cable modem of claim 21, further comprising a set of machine language instructions executable by said central processing unit for:
   (a) causing said frequency selection system to operate at said second bandwidth;
   (b) tuning said frequency selection system to a first center frequency;
   (c) obtaining a first power level from a first power level signal from said power measurement system; and
   (d) tuning said frequency selection system to a second center frequency;
   (e) obtaining a second power level from a second power level signal from said power measurement system.

23. The cable modem of claim 22, wherein said set of machine language
   instructions are executable by said central processing unit for:
   determining whether said first and second power levels are both greater than a first threshold power level.

24. The cable modem of claim 23, wherein said set of machine language instructions are executable by said central processing unit for:
   determining whether said first power levels exceeds said second power level by a predetermined amount.

25. The cable modem of claim 24, wherein said set of machine language instructions are executable by said central processing unit for:
   determining whether said first and second power levels are both less than a second threshold power level.

26. A method of initializing a cable modem, said cable modem being disposed for receiving a signal transmitted over a cable network, said method comprising the steps of:
   selectively receiving a first band of frequencies centered about a first center frequency, said first band of frequencies having a first bandwidth;
   selectively receiving a second band of frequencies centered about a second center frequency, said second band of frequencies having a second bandwidth substantially equal to said first bandwidth;
   selectively receiving a third band of frequencies centered about a third center frequency, said third band of frequencies having a third bandwidth substantially greater than said first bandwidth, said third band of frequencies including frequencies from said first band of frequencies and from said second band of frequencies;
   demodulating said third band of frequencies to obtain a digital signal; and
   said cable modem synchronizing with said digital signal.

27. The method of claim 26, further comprising the steps of:
   obtaining a first power measurement indicative of the power level of said first band of frequencies; and
   obtaining a second power measurement indicative of the power level of said second band of frequencies.

28. The method of claim 26, wherein said third band of frequencies comprises a quadrature amplitude modulated (QAM) digital signal.

29. The method of claim 28, wherein said signal includes a plurality of signal components, said signal components including said quadrature amplitude modulated (QAM) digital signal and at least one analog television signal.

30. In a data-over-cable system in which the signal is transmitted over a cable network to a cable modem, said signal comprising a plurality of signal components defined by a plurality of frequency channels, said cable modem having a tunable frequency selection system operable at a wide bandwidth and at a narrow bandwidth,
   a method for selectively receiving a target signal component from among said plurality of signal components, said method comprising the steps of:
   tuning said frequency selection system to a first frequency in one of said predetermined frequency channels, said frequency selection system operating at said narrow bandwidth, said frequency selection system providing a first filtered signal from a first band of frequencies of said signal centered about said first frequency;
   measuring the power of said first filtered signal to obtain a first power measurement;
   tuning said frequency selection system to a second frequency in said one of said predetermined frequency channels, said frequency selection system operating at said narrow bandwidth, said frequency selection system providing a second filtered signal from a second band of frequencies of said signal centered about said second frequency;
   measuring the power of said second filtered signal to obtain am second power measurement; and
   if said first and second power measurements both exceed a predetermined level, operating said frequency selection system at said wide bandwidth to provide a third filtered signal from a third band of frequencies in said one of said predetermined frequency channels.

31. The method of claim 30, further comprising the step of:

said cable modem demodulating said third filtered signal to obtain a digital signal.

32. The method of claim 31, further comprising the step of:

said cable modem synchronizing with said digital signal.

33. The method of claim 30, wherein said first frequency substantially corresponds to an expected frequency for a visual carrier if said one of said predetermined frequency channels defined an analog television signal.

34. The method of claim 33, wherein said second frequency exceeds said first frequency by about 1 to 3 MHz.

35. The method of claim 30, wherein said narrow bandwidth is in the range of 100 kHz to 1 MHz.

36. In a cable telecommunications system in which a transmitter transmits a signal over a cable network to a receiver, said signal comprising a plurality of signal components defined by a plurality of predetermined frequency channels, said frequency channels having a channel bandwidth, a method for identifying a possible channel plan, said method comprising the steps of:

tuning a frequency selection system to a first frequency, said first frequency corresponding to an expected frequency for a visual carrier in a first channel plan, said frequency selection system providing a first filtered signal from a first band of frequencies of said signal centered about said first frequency;

measuring the power of said first filtered signal to obtain a first power measurement;

tuning said frequency selection system to a second frequency, said second frequency corresponding to an expected frequency for a visual carrier in a second channel plan, said frequency selection system providing a second filtered signal from a second band of frequencies of said signal centered about said second frequency;

measuring the power of said second filtered signal to obtain a second power measurement;

if said first power measurement exceeds said second power measurement by at least a predetermined amount, identifying said first channel plan as said possible channel plan; and if said second power measurement exceeds said first power measurement by at least said predetermined amount, identifying said second channel plan as said possible channel plan.

37. The method of claim 36, wherein said frequency selection system has a bandwidth substantially less than said channel bandwidth.

* * * * *